United States Patent [19]

Kunze et al.

[11] Patent Number: 5,433,104
[45] Date of Patent: Jul. 18, 1995

[54] METHOD AND APPARATUS FOR ULTRASONIC LEAK LOCATION

[75] Inventors: Ulrich Kunze; Walter Knoblach, both of Erlangen; Günther Schulze, Fürth, all of Germany

[73] Assignee: Siemens Aktiengesellschaft, Munich, Germany

[21] Appl. No.: 109,387

[22] Filed: Aug. 19, 1993

[30] Foreign Application Priority Data

Aug. 19, 1992 [DE] Germany .................. 42 27 459.1

[51] Int. Cl.$^6$ ............................................. G01M 3/24
[52] U.S. Cl. ................................................ 73/40.5 A
[58] Field of Search ................. 73/40.5 A, 587, 592

[56] References Cited

U.S. PATENT DOCUMENTS

| | | | |
|---|---|---|---|
| 3,814,207 | 6/1974 | Kusada et al. | 73/40.5 A |
| 4,321,528 | 3/1982 | Reichel et al. | 324/77 D |
| 4,457,163 | 7/1984 | Jäckle | 73/40.5 A |
| 4,640,121 | 2/1987 | Leuker et al. | 73/40.5 A |
| 4,858,462 | 8/1989 | Coulter et al. | 73/40.5 A |
| 5,031,446 | 7/1991 | Saito et al. | 73/40.5 A |

FOREIGN PATENT DOCUMENTS

| | | |
|---|---|---|
| 0091087 | 10/1983 | European Pat. Off. . |
| 0140174 | 12/1987 | European Pat. Off. . |
| 0444200 | 9/1991 | European Pat. Off. . |
| 0451649 | 10/1991 | European Pat. Off. . |
| 2503363 | 10/1982 | France . |
| 0152415 | 11/1981 | German Dem. Rep. . |
| 2916158 | 10/1980 | Germany . |
| 3240136 | 5/1984 | Germany . |
| 3334252 | 4/1985 | Germany . |
| 3336245 | 4/1985 | Germany . |
| 3726585 | 2/1989 | Germany . |
| 3812101 | 11/1989 | Germany . |
| 58-034334 | 2/1983 | Japan . |
| 63-070139 | 3/1988 | Japan . |
| 1446554 | 12/1988 | U.S.S.R. . |
| 1710930 | 2/1992 | U.S.S.R. . |

OTHER PUBLICATIONS

Lord et al. "Attenuation of Elastic Waves in Pipelines as Applied to Acoustic Emission Leak Detection", Material Evaluation, Nov. 1973 pp. 49–54.
"Detect buried steam leaks with acoustics", Sabo, Electrical World, vol. 186, No. 1, Jul. 1, 1976, p. 40.
Siemens Publ., Order No. A19100–UG53–A212(1990), pp. 2–12 "Alüs Acoustic Leakage Monitoring System".
American Society For Nondestr. Testing, Jul. 1992, pp. 875–882 (Fowler) "Chemical Industry Application of Acoustic Emission".
American Society For NonDestr. Teating, Nov. 1989, pp. 1297–1300(Kuperman) "Characterization of Acoustic Signals From Leaking Intergranular".

Primary Examiner—Hezron E. Williams
Assistant Examiner—Michael J. Brock
Attorney, Agent, or Firm—Herbert L. Lerner; Laurence A. Greenberg

[57] ABSTRACT

A method for ultrasonic leak location includes showing sound levels at various measuring locations along a measurement segment, which is a part of an annular structure, with a bar diagram. The same bar diagram is added again to the bar diagram. A particular sound level having the highest value and being located the most in the middle of the placed together bar diagrams is picked out. A segment around the associated pickup positions having one complete set of pickup positions is picked out. Two compensating straight lines for that set having an intersection being ascertained to identify the leakage position are determined. Another method includes providing at least a sound level having a position substantially facing the leakage position with a correction value. An apparatus for ultrasonic leak location includes a number of ultrasound pickups being disposed along a measuring segment. Amplifiers and components forming an effective value connect a data processing system to outputs of the ultrasound pickups. The data processing system forms a placed together representation of two bar diagrams. In another apparatus, the data processing system stores correction values for the sound levels and corrects the sound levels accordingly.

2 Claims, 3 Drawing Sheets

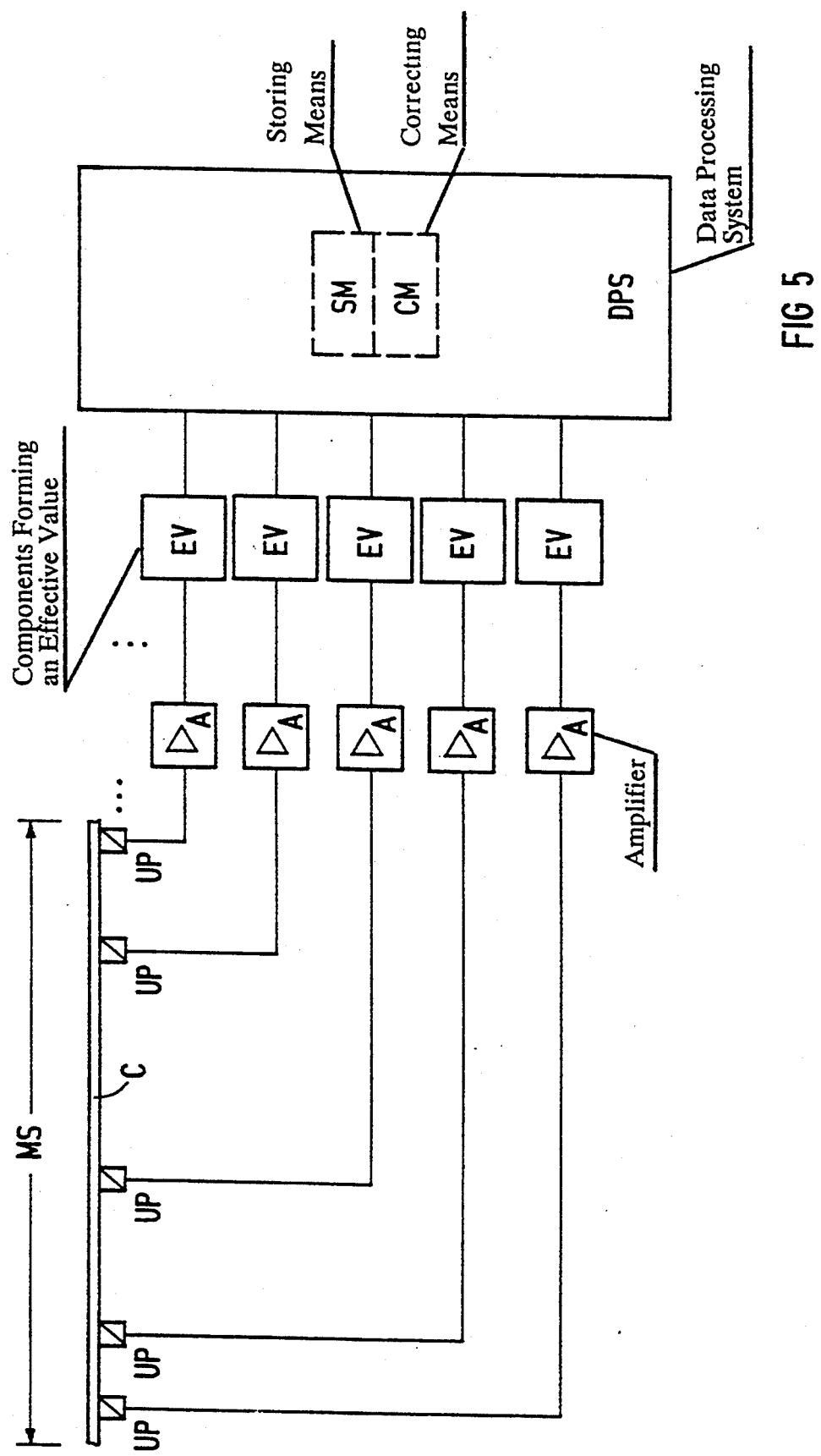

METHOD AND APPARATUS FOR ULTRASONIC LEAK LOCATION

BACKGROUND OF THE INVENTION

FIELD OF THE INVENTION

The invention relates to a method for ultrasonic leak location, in which sound levels measured at various measuring sites along a measurement segment are represented in a bar diagram, and in which the intersection of two compensating straight lines is ascertained to identify the location of the leakage. The invention also relates to an apparatus for performing the method.

A method and an apparatus of the above-mentioned type are known from European Patent No. 0 140 174, particularly FIG. 5, and from a brochure entitled "ALÜS Acoustical Leakage Monitoring System, Order No. A19100-U653-A212, April 1990, published by Siemens A. G., Energy Production Division, D-91050 Erlangen, Germany.

The method of acoustical leakage monitoring under consideration herein is based on the fact that liquids, vapors or gases produce structure-borne sound as they flow out of a leak and in case of vapors or gases expand. The noises are propagated in affected components (such as pipelines, containers, pumps, valves) and are measured by sound transducers or sound pickups. The latter are mounted at certain intervals on the surface of the components being monitored.

The effective or r.m.s. value E (r.m.s. = root mean square) of the high-frequency sound transducer signals is used as a measuring variable according to the formula:

$$E = \frac{1}{T} \int E_{HF}^2 \cdot dt = \left( \frac{1}{T} \int E_{HF}^2 \cdot dt \right)^{0.5}. \quad (1)$$

During normal operation, the flow noises generate a background signal level $E_o$. The sudden occurrence of a leak generates a leakage noise level $E_L$ at a location $x_i$ of the sound transducer (i=1, 2, ...), having a magnitude which depends on the size of the leak and on its distance from the sound transducer. A total noise level $E_{L,o}$ at the location $x_i$ of a transducer is the result of superposition of the leakage noise and operating noise, in accordance with the following formula:

$$E_{L,o} = (E_o^2 + E_L^2)^{0.5}. \quad (2)$$

That means that a leak which generates the same noise level as the operating noise at the location $x_i$ of the sound pickup raises the total noise level by approximately 40%, which is a rise that is readily measurable.

In order to locate the leak, the proportion determined by the leak noise must first be determined for each measuring site $x_i$, from the sound levels measured by the pickups. That is done in a known way by subtracting the background noise of the system, $E^2_o$, in accordance with the following formula:

$$E^2_L = E^2_{L,o} - E^2_o. \quad (3)$$

The net sound levels $E^2_L$ (or the corresponding value $E_L$) at the i different locations $x_i$ along the measuring segment are logarithmically shown in a bar diagram and, if a leak is present, the intersection of two compensating straight lines, which will then be present, is utilized to identify the leakage location $x_L$. (When using the values $E_L$ instead of $E^2_L$ the same final results are obtained.)

In other words, in the method under consideration herein, the operating sound level (r.m.s. value) is monitored for anomalous changes in the ultrasonic range, using a plurality of permanently installed pickups. The frequency range is chosen in such a way that the high-frequency proportions of the leak noise that are above the operating sound level are detected, but the low-frequency, mechanically induced sound waves are filtered out. During normal operation, the r.m.s. values of the various pickups are largely constant. Conversely, leaks cause an increase in the values. Through the use of the known method, the proportion that can be ascribed solely to the leak is determined from that rise for each pickup. That proportion decreases according to the laws of physics as the distance from the leak increases.

As was already noted, that proportion is represented logarithmically as a function of the various pickup locations $x_i$ in the form of a bar diagram. Relatively long pipelines or branching pipelines are split up into monitoring segments, and for each segment one such bar diagram is prepared. Annular structures are "split up". In other words, the point of the split is considered to be the beginning and ending point of a linear structure.

It has been found that with annular structures, inaccuracies can arise in determining the location of the leak. That may have various causes. There is accordingly a need to perform as accurate leakage location as possible, even with such annular structures.

SUMMARY OF THE INVENTION

It is accordingly an object of the invention to provide a method and an apparatus for ultrasonic leak location, which overcome the hereinafore-mentioned disadvantages of the heretofore-known methods and devices of this general type and which do so in such a way that more accurate leakage location is possible with annular structures.

With the foregoing and other objects in view there is provided, in accordance with the invention, a method for ultrasonic leak location, which comprises illustrating sound levels at various measuring locations along a measurement segment, with a bar diagram; adding the same bar diagram again side-by-side to the bar diagram; picking out or looking for a particular sound level having the highest value and being located the most in the middle of the placed together or side-by-side bar diagrams; picking out or singling out a segment around the associated pickup positions having one complete set of pickup positions; and determining two compensating straight lines for that set having an intersection being ascertained to identify the leakage position.

With the objects of the invention in view, there is also provided a method for ultrasonic leak location, which comprises illustrating sound levels at various measuring locations along a measurement segment, with a bar diagram; ascertaining an intersection of two compensating straight lines to identify a leakage position; and providing at least a sound level having a position substantially opposite or facing the leakage position with a correction value.

In accordance with another mode of the invention, there is provided a method which comprises calling up the correction value from a data memory.

With the objects of the invention in view, there is additionally provided an apparatus for ultrasonic leak location, comprising a number of ultrasound pickups being disposed along a measuring segment and having outputs; a data processing system; amplifiers; and components forming an effective value; the amplifiers and the components connecting the data processing system to the outputs of the ultrasound pickups; and the data processing system forming a placed together or side-by-side representation of two bar diagrams.

With the objects of the invention in view, there is furthermore provided an apparatus for ultrasonic leak location, comprising a number of ultrasound pickups being disposed along a measuring segment and having outputs; a data processing system; amplifiers; and components forming an effective value; the amplifiers and the components connecting the data processing system to the outputs of the ultrasound pickups; and the data processing system having means for storing correction values for the sound levels and means for correcting the sound levels accordingly.

The invention is thus based on the concept that it is useful, with respect to the first method, to achieve an improvement in ascertaining the compensating straight lines. The second method is based on the concept that by means of correction values, the superposition of the noise that travels from a leak to a pickup in the opposite direction over the annular structure can be compensated for.

Other features which are considered as characteristic for the invention are set forth in the appended claims.

Although the invention is illustrated and described herein as embodied in a method and an apparatus for ultrasonic leak location, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 illustrates a measuring segment of an affected component (e.g. pipe, valve, etc.) with several ultrasound pickups permanently mounted on it, amplifiers, components forming an effective value, and a data processing system.

DESCRIPTION OF THE PREFERRED EMBODIMENTS

Figure 1:
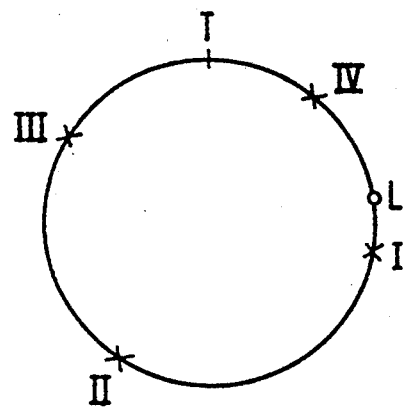
FIG. 1 is an elevational view of an annular structure with four ultrasonic pickup positions, one splitting point, and one leak point.
Figure 2:
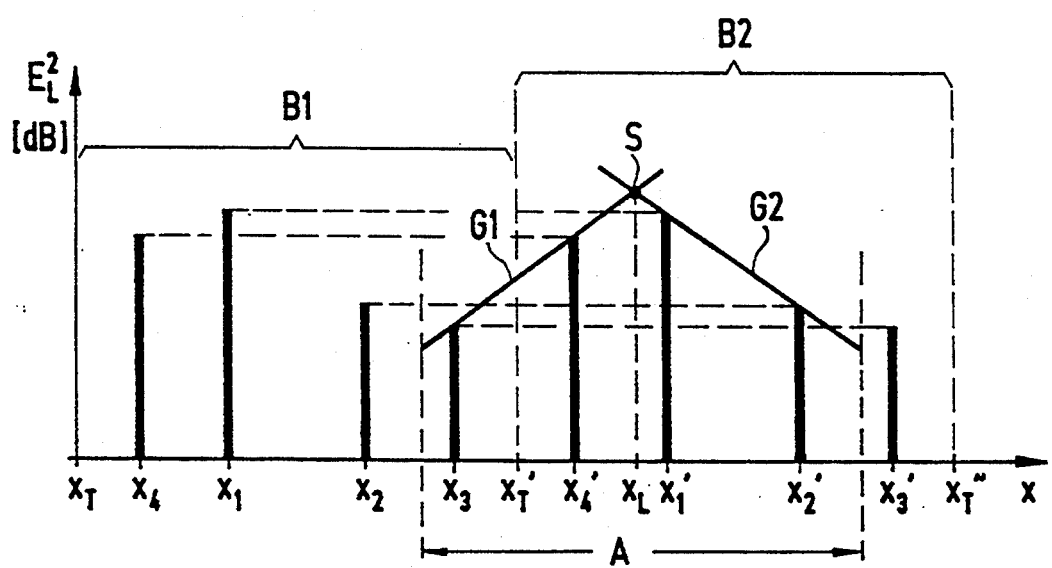
FIG. 2 illustrates two identical bar diagrams placed side-by-side, in which the aforementioned r.m.s. values are plotted above location coordinates ($x_i$)

Referring now to the figures of the drawing in detail and first, particularly, to FIG. 1 thereof, it is assumed for the sake of simplicity that ultrasonic pickups I, II, III, IV have been mounted along an annular monitoring segment in a pressure-carrying system (such as the primary loop of a nuclear power plant) at only four measuring positions or points $x_1$, $x_2$, $x_3$ and $x_4$ shown in FIG. 2. In practice, however, from 5 to 10 such measuring positions will be monitored. A splitting point is marked with reference symbol T and a leak point is marked with reference symbol L.

In FIG. 2 logarithmized sound levels $E^2_L$ are entered for each measuring position $x_i$ in the form of a bar. The diagram begins at $x_T = 0$.

It is notable that at an ascertained bar diagram B1, the same bar diagram in the form of a diagram B2 is added again next to it. Proceeding in this way is especially useful if the splitting point T is located in the vicinity of the leak point L. This is because in that case an especially significant improvement in leak location can be achieved.

With the bar diagrams B1, B2 that are then placed together or side-by-side, the particular sound level that has the highest value and is located as close as possible to the middle of the illustration which is shown is then looked for, advantageously with the aid of a computer system. In the present case, this level is at a pickup position $x_1'$. A segment A around this pickup position which is then looked for contains one complete set of pickup positions $x_i$. In the present case these are the pickup positions $x_3$, $x_4'$, $x_1'$ and $x_2'$. It is then possible to determine compensating straight lines G1 and G2 with relatively great accuracy by calculation in this segment A. An intersection S of these two compensating straight lines G1, G2 is then ascertained. It describes a leak position $x_L$.

Figure 3:
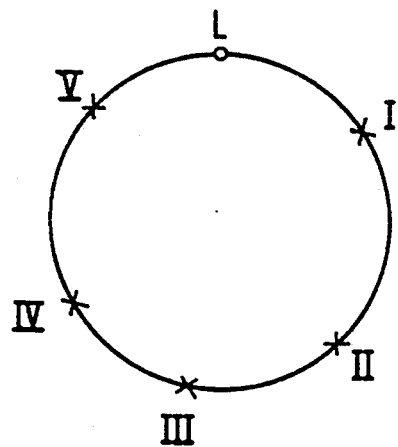
FIG. 3 is a view similar to FIG. 1 showing an annular structure with five ultrasonic pickups and one leak point.

FIG. 3 shows a further annular structure which includes a total of five ultrasonic pickups I-V. It is notable herein that no splitting was performed. Once again, the leak is indicated at reference symbol L.

Figure 4:
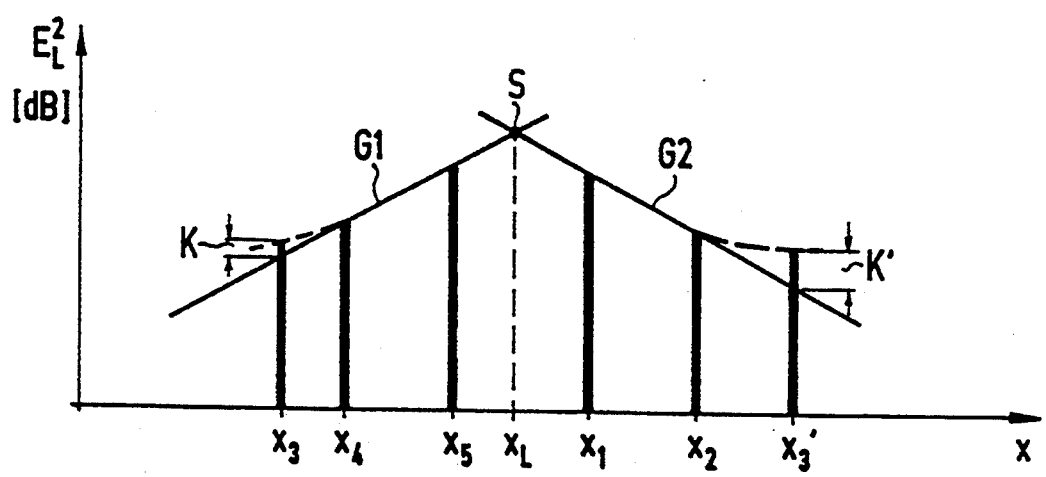
FIG. 4 is an associated bar diagram, in which disproportionately elevated ultrasound levels are entered at a particular pickup that is located facing the leak point.

FIG. 4 shows a bar diagram for FIG. 3. It should be noted herein that a disproportionate elevation of the leak noise level, that is a major deviation from the respective compensating straight lines G1 and G2, occurs in the region of the ultrasonic pickup III. This disproportionate increase can be ascribed to an undesired superposition of the leak noises that have reached the ultrasonic pickup III in the clockwise and counterclockwise direction. In other words, this kind of undesired superposition makes itself disadvantageously felt particularly at those pickups that are facing the leak point L.

According to the invention a correction value K is then provided, by means of which the sound level is compensated for at each pickup at which this kind of disproportionate increase, that is to be ascribed to a superposition of leakage noise, occurs. Once such compensation has been performed, the leakage location $x_L$ can be ascertained with particular accuracy by means of the intersection S. In the present case, the correction values K and K' have been entered at positions $x_3$ and $x_3'$.

It should accordingly also be noted that depending on an individual case, a correction in the adjacent pickups, which in the present case is at the pickups II and IV, is entirely possible as well.

The aforementioned correction values K and K' etc. are advantageously stored in memory in a computer system and are used for correction purposes in calculating the compensating straight lines G1 and G2. Such correction values K and K' can be ascertained by calculation. However, it is also possible to ascertain them by trial and error.

FIG. 5 contains the principal measurement arrangement according to the invention. The drawing shows a measuring segment MS of an affected component C (e.g. pipe, valve, etc, herein simply drawn as straight pipe). A number of ultrasound pickups UP are disposed along the measuring segment MS and are fixly and permanently mounted at the affected component C. The output signals of the ultrasound pickups UP are lead to amplifiers A, which are connected to electrical components EV, the latter forming an effective value which will be processed within a data processing system DPS. The components EV forming the effective value may be stand alone components or may be parts of the data processing system DPS. The latter forms the adjacent representation of two bar diagrams as depicted in FIG. 2. It further comprises storing means SM for storing correction values for the sound levels and means CM for correcting the sound levels accordingly.

We claim:

1. A method for ultrasonic leak location, which comprises:

showing sound levels at various measuring locations along a measurement segment defined as a part of an annular structure, with a bar diagram;

adding the same bar diagram again next to the bar diagram;

picking out a particular sound level having the highest value and being located the most in the middle of the placed together bar diagrams;

picking out a segment around a location of the particular sound level, which segment has one complete set of pickup positions; and determining two inclined straight lines for that set having an intersection being ascertained to identify the leakage position.

2. An apparatus for ultrasonic leak location, comprising:

a number of ultrasound pickups being disposed along a measuring segment defined as a part of an annular structure and having outputs; said outputs being connected to means for showing sound levels measured by said ultrasound pickups at various measuring locations as a bar diagram;

means for adding the same bar diagram again next to the bar diagram;

means for picking out a particular sound level having highest value and being located the most in the middle of the placed together bar diagram;

means for picking out a segment around a location of the particular sound level, which segment has one complete set of pickup positions; and means for determining two inclined straight lines for that set having an intersection being ascertained to identify the leakage position.

* * * * *